US 8,636,968 B2

(12) United States Patent
Omotowa

(10) Patent No.: US 8,636,968 B2
(45) Date of Patent: Jan. 28, 2014

(54) METHOD FOR UV PHOTOLYTIC SEPARATION OF POLLUTANT GASES FROM AN EMISSION STREAM

(76) Inventor: Bamidele A. Omotowa, Idaho Falls, ID (US)

( * ) Notice: Subject to any disclaimer, the term of this patent is extended or adjusted under 35 U.S.C. 154(b) by 208 days.

(21) Appl. No.: 13/006,110

(22) Filed: Jan. 13, 2011

(65) Prior Publication Data

US 2011/0171091 A1 Jul. 14, 2011

Related U.S. Application Data

(60) Provisional application No. 61/335,821, filed on Jan. 13, 2010.

(51) Int. Cl.
*B01D 53/00* (2006.01)
*B01D 53/14* (2006.01)
*B01J 20/34* (2006.01)

(52) U.S. Cl.
USPC ........ 423/210; 423/228; 423/230; 423/239.1; 423/242.1; 423/242.7; 502/20; 502/514; 502/522

(58) Field of Classification Search
USPC ........ 423/210, 228, 230, 239.1, 242.1, 242.7; 502/20, 514, 522
See application file for complete search history.

(56) References Cited

U.S. PATENT DOCUMENTS

| | | |
|---|---|---|
| 4,694,179 A | 9/1987 | Lew |
| 4,892,712 A | 1/1990 | Robertson |
| 4,954,465 A * | 9/1990 | Kawashima et al. ............ 502/5 |
| 5,861,123 A | 1/1999 | Schifftner |
| 5,865,959 A | 2/1999 | Meinzer |
| 2005/0274898 A1 | 12/2005 | Watanabe |
| 2006/0063668 A1 | 3/2006 | Tseng |

FOREIGN PATENT DOCUMENTS

DE 35 25 975 A1 * 1/1987 ............ B01D 53/34

OTHER PUBLICATIONS

Amine Scrubbing for CO2 Capture, Gary T. Tochelle, et al., Science 325, 1652 (Sep. 25, 2009).
Carbon Dioxide Capture from Existing Coal-Fired Power Plants, DOE/NETL-401/110907. Final Report (Original Issue Date, Dec. 2006). Revision Date, Nov. 2007, Massood Ramezan et al.

* cited by examiner

*Primary Examiner* — Timothy Vanoy
(74) *Attorney, Agent, or Firm* — Robert L. Shaver; Dykas & Shaver

(57) ABSTRACT

A method and apparatus for separating gaseous emission pollutants from a scrubber by using a narrow band of UV light energy emitted from an LED light source. The method includes sweeping the evolved gas away from the flow of liquid containing the pollutant using a non-reactive gas. The pollutant can be $CO_2$, $NO_x$, $SO_x$, or other pollutants. The method can operate on multiple pollutants the gas stream, using different banks of LEDs, specifically tuned for a certain pollutant.

27 Claims, 12 Drawing Sheets

METHOD FOR UV PHOTOLYTIC SEPARATION OF POLLUTANT GASES FROM AN EMISSION STREAM

PRIORITY/CROSS-REFERENCE TO RELATED APPLICATIONS

This application claims the benefit of U.S. Provisional Application No. 61/335,821, filed Jan. 13, 2010, the disclosure of which is hereby incorporated by reference.

TECHNICAL FIELD

The present invention generally relates to methods for removing pollutants from emission streams, and more particularly, by use of UV light generated by LED sources in a narrow bandwidth to efficiently separate and remove pollutants of an emission stream from a scrubber.

BACKGROUND

Coal-fired power plants equipped with the latest thermal process to extract carbon dioxide ($CO_2$) burn 30% more coal than plants that do not extract $CO_2$. $CO_2$ capture requires more coal because it creates a 24% parasitic energy demand by $CO_2$ absorption, desorption, and compression unit operations. Because of this huge added cost, operators of coal-fired plants are resistant to adding $CO_2$ capture technology.

Several international treaties on the Earth's climate at Montreal, Kyoto, and Copenhagen have demonstrated the importance of global regulation of emissions of greenhouse gases, particularly $CO_2$. According to the EPA, the process of generating electricity is the single largest source of $CO_2$ emissions in the United States, representing 41% of all $CO_2$ emissions, with over 80% of the $CO_2$ from electricity generation coming from coal-fired power plants. Unfortunately, coal will continue to be used as a major source of power generation in the U.S. for the foreseeable future, and according to the World Coal Institute, coal's share in global electricity generation is set to increase from 41% to 44% by 2030. With this in mind, reducing the environmental impacts of coal, especially $CO_2$ production, is vital, and capturing $CO_2$ in the most efficient and cost effective manner is critical for the industry.

Two major reviews in 2009 discussed three $CO_2$ capture concepts for coal-fired power plants—(a) post-combustion capture, (b) oxy-combustion capture, and (c) pre-combustion capture; with the post-combustion capture technology being the most efficient, cost effective, and most adopted today. There are four major categories of current technologies for post-combustion $CO_2$ capture. These are (i) amine absorption; (ii) reactive oxide/carbonate solids; (iii) zeolite absorption, and (iv) membranes. The challenges for adoption of each of these technologies have been discussed by Rochelle et al. in 2009. Amine absorption of $CO_2$ is the most advanced, most well understood, and most successful method, with monoethanolamine (MEA) as the most widely deployed amine in $CO_2$ capture in the industry. The United States Department of Energy also considers the amine solvent process as the current state-of-the-art in capture technology. Unfortunately, even using the MEA technology dramatically drops a power plant's overall thermal efficiency from 39% to 29%. In an amine solvent process, $CO_2$ is readily absorbed by an amine solution from flue gas. However, thermally extracting the $CO_2$ from the amine solution is energy intensive and incurs burning 30% more coal than is necessary to generate electricity. The thermal process increases the cost of electricity (COE) by 81% for a supercritical pulverized coal plant. The bulk of this parasitic energy is used for maintaining steam boilers that provide 100-120° C. temperature for thermal desorption of $CO_2$ from an amine scrubber.

Recently, using Dow Chemical Company's 30% MEA for scrubber/separation processes of $CO_2$ capture has produced better efficiencies than with 20% MEA of Kerr-McGee, by reducing the amount of energy expended from 0.51 to 0.37 megawatt-hours (MWh) per metric ton of $CO_2$ removed. The decrease in required energy has reduced the cost for the removal of $CO_2$ from $82 to $51 per ton (t), but has still left us with an increase in the COE of 81%. The photochemical $CO_2$ separation technology in this proposal has the potential to reduce the COE to 35%. This is significant for reaching the goal of less than 35% COE. A review by Ramezan et al. has concluded that this incremental improvement to the thermal process has yet to come close to achieving the DOE goal (and potentially EPA's regulatory standard) of 90% $CO_2$ removal with less than a 35% increase in COE. The disclosed photolysis process has the potential to meet this goal.

SUMMARY OF THE DISCLOSURE

The purpose of the Abstract is to enable the public, and especially the scientists, engineers, and practitioners in the art who are not familiar with patent or legal terms or phraseology, to determine quickly from a cursory inspection, the nature and essence of the technical disclosure of the application. The Abstract is neither intended to define the inventive concept(s) of the application, which is measured by the claims, nor is it intended to be limiting as to the scope of the inventive concept(s) in any way.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature.

The disclosed technology addresses the need for reduction of greenhouse gases by a transformative and new photolytic technology to replace the current less efficient thermal process for capturing $CO_2$ emissions from combustion processes of coal-fired power plants. Additionally, the disclosed technology is useful to separate other pollutants from emission streams. The emission streams can be associated with power plants, internal combustion engines, or other sources of pollutants in emissions.

The photolytic process has the potential to dramatically cut the 30% increase in coal usage by more than half, a dramatic reduction that will significantly reduce the cost of capturing $CO_2$ and improve the acceptance of carbon capture by companies that operate coal-fired plants. The disclosed technology has the capacity to capture more than 90% of the six to ten thousand tons per day of $CO_2$ produced by a 500 MWe coal-fired power plant, as an example.

One aspect of the disclosed technology transforms the current state-of-the-art MEA technology by replacing the current energy parasitic thermal processes with a photochemical process. Photolysis is an innovative and novel alternative source of energy using UV photons. Studies have shown that photolysis, providing energy in the form of photons, can effectively replace the thermal process with a significant reduction in required energy and with efficiency comparable to the current thermal MEA technology for $CO_2$ desorption in a continuous process. The disclosed technology reduces the parasitic COE to less than 50% of the current burden. Research has shown that photochemical reactions are several orders of magnitude faster and use significantly less energy than conductive thermal processes. As a result, some industries, like the manufacture of photoresist in microelectronic components, are using ultraviolet light emitting diodes (UV LEDs) to power energy efficient and effective photochemical processes.

The disclosed photochemical technology has two additional significant benefits. First, it builds on the state-of-the-art MEA technology. Second, since it replaces only the thermal process in MEA technology, it has the potential to be cost effectively retrofitted into existing plants with minimal down time.

The state-of-the-art MEA technology can be described as follows; MEA selectively absorbs $CO_2$ to a maximum 0.542 molCO$_2$/moIMEA and is then sent to a stripper. In the stripper, the $CO_2$-rich MEA solution is heated to 120-150° C. in a desorption chamber to release almost pure $CO_2$. The $CO_2$-lean MEA solution is then recycled to the absorber. There have been only two commercial MEA-absorber processes since the 1970s; that is (i) a 20% MEA solution by Kerr-McGee used primarily with coal-fired boilers; and (ii) a 30% MEA solution by Dow Chemical used primarily on natural gas fired plants. Both the 20% and 30% MEA solutions have become the standard for $CO_2$ capture from power plant flues and both are used at installations worldwide. FIG. 1 illustrates the prior art processes of a pulverized coal power plant without $CO_2$ capture and FIG. 2 illustrates the prior art amine-absorption/thermal separation for scrubbing $CO_2$ capture. As FIG. 2 implies, the amine plant is usually a separate unit located in the power facility.

Prior studies have shown that it could take as little as 43 kWh to capture 1 t $CO_2$. A typical power plant without carbon capture produces 1 t $CO_2$ for every 1200 kWh of net power generated. The theoretical minimum energy requirement for the DOE standard of 90% $CO_2$ separation (as a percentage of net power production) is: [43 kWh/t of $CO_2$ captured]×[9 t captured/10 t produced]/[1200 kWh/t $CO_2$ produced]=3.2%. However, the estimated actual parasitic load of the $CO_2$ separation system is 16%, which is 5 times more than the minimum required 3.2% of the power produced. For the thermal process, 16% of the total output of 1200 kWh/t $CO_2$ produced, (i.e., 0.16×1200 kWh=168 kWh) is required to separate 1 t $CO_2$ from $CO_2$-rich MEA. By comparison the disclosed technology can convert 1 kWh of electrical power input to more than 11.6 kWh photon energy output for the $CO_2$ separation process (see legend of Table 1). Table 1 shows a comparison of energy required for thermolysis and photolytic $CO_2$ separation. The actual parasitic loading for a photochemical separation process will be 1/11.6 of amount currently used by the thermal process.

Table 1—Comparison of energy required for thermal & photochemical separation & compression of $CO_2$

TABLE 1

Comparison of energy required for thermal & photochemical separation & compression of $CO_2$

| | Thermal/MEA-technology | Photochemical/MEA-technology |
|---|---|---|
| Properties | | |
| % of parasite energy | 16% | [(1/11.6) × 62] = 5.63% |
| Potential total % COE | 81% | 35.11% (= 43.35/100 × 81) |
| Constituent processes | | |
| % required for $CO_2$ Separation | 62% | 5.35% (photolysis reduced %) |
| % required for $CO_2$ compression | 33% | 33% |
| % required for Flue draft blower | 5% | 5% |
| Total | 100% | 43.35% |
| Energy/potential energy expended to separate 1 t $CO_2$ | 16% of 1200 kWh $CO_2$ = 168 kWh (or 0.17 MWh) heat energy of steam | 46.8 kWh (electrical, LED) can be used to generate 0.542 MWh photon energy |

Footnote:
According the specification of state-of-the-art LC-L3 UV-LED from HAHMAMTSU: UV intensity = 4600 mW/cm$^2$ = 4600/1000/1000 = 0.0046 kW/cm$^2$.
Output power = (0.0046 kW/cm$^2$/s) × (365 d × 24 h) = 40.296 kWh/cm$^2$ At 22.4 fold (by collimation), the output power = (22.4) × (40.296) = 902.6304 kWh/cm$^2$ Power input (max.) = (80/1000) × (356 × 24) = 700.8 kWh Efficiency = 902.6304/700.8 = 1.288/cm$^2$.
According to HAMAMATSU specifications the impact area of the LC-L3 UV-LED is 9 cm$^2$.
This means that the efficiency = 1.288/cm$^2$ × 9 cm$^2$ = 11.6.
The equivalent efficiency for the thermal process = 2.2.

The parasitic power demand of the thermal $CO_2$ separation process results in 81% increase in the Cost of Electricity (COE). There are three parts to the parasitic power demand; the thermal $CO_2$ separation process, the $CO_2$ compression process, and the draft blowers for the flue gas. The thermal $CO_2$ separation process requires 62% of the parasitic energy, the $CO_2$ compression process uses 33%, and the draft blowers require 5%. According to HAMAMATSU LED specifications, 1 kWh of electricity will create 11.6 kWh of photon energy. Applying this to the parasitic energy required for thermal $CO_2$ separation leads to the conclusion that 1/11.6 of 62% of the parasitic energy required for thermal $CO_2$ separation equals only 5.35%, the new, reduced requirement for $CO_2$ separation using an LED UV source. Applying this new percentage to the COE for $CO_2$ separation, reduces the increase in the COE from 81% for the thermal process, to only 43.4%, a decrease of 37.6% (33% for compression plus 5% for blowers plus 5.35% for separation equals 43.35%).

By using available efficiencies of electricity powered UV generation, the disclosed photochemical technology has the potential to cut the parasitic power demands of the current thermal technology by almost half; from 16% to only 9.1%. This will reduce the cost of removing a ton of $CO_2$ from the current efficiency at $51/t to only about $35/t of $CO_2$ separated.

In typical photochemical reactions, a molecule gains the necessary activation energy to undergo change by absorbing monochromatic or non-monochromatic UV irradiation (releasing photon energy) from a light source (see FIG. 3). Absorbed photons can (i) bring the molecule to the necessary activation energy, or (ii) change the symmetry of the molecule's electronic configuration, in order to enable an otherwise inaccessible reaction path. Successful application of photolytic technology to large scale photolysis is dependent on (i) the intensity the UV irradiation and (ii) the molar absorptivity of absorbing species in a process. The rate of reaction "I" is the number of photons absorbed per unit time and unit. However, I, appears is the Beer-Lambert-Bouguer (BLB) law relating incident, $l_1$, and transmitted light intensity, $I_o$, path length, e, and concentration, c:[11]

$$I_1 e^{-klc} = I_o \times 10^{-\epsilon cl} \quad \text{(Eqn. 1)}$$

However, due to very high concentration of $CO_2$ absorption by 20% and 30% aqueous MEA absorbers, there may be a concern on the part of the reviewers that the UV absorption by the $CO_2$ separation process may not strictly follow the BLB law. Therefore, the next three subsections discuss large scale industrial applications of UV irradiation, $CO_2$ separation from carbamate in the literature, and a preliminary analysis demonstrate that $CO_2$ is desorbed from a 20% amine when exposed to UV radiation.

INDUSTRIAL APPLICATIONS

For years there have been large-scale applications of photochemistry in the cleaning of chlorinated compounds from public swimming pools and in the treatment of dissolved dyes in industrial effluent of the textile industry. More recently, studies of photodissociation of insecticide carbamates to form free amine and $CO_2$, much like the disclosed technology, has been successful and has shown that photolysis occurs at faster rate than the thermolysis or hydrolysis. These studies were conducted using UV generators with only a fraction of the quantum efficiency of current LED generators (see Table 2). Table 2 show the photon output and quantum efficiency of UV lamp generation sources and the obvious higher efficiency of the LEDs.

Recently, LEDs—the most powerful artificial UV generators—have been applied on a large scale in the microelectronic industry as a photoinitiator. Efficiency requirement of the microelectronics industry has resulted in the development of ever-increasing LEDs power densities, currently at about 4600 $mW/cm^2$. Generally, the photolytic dissociation of amine carbamates, like $NH_3$—$CO_2$, has been achieved by application of UV light at 290-360 nm wavelengths—this coincides directly with high brightness UV LEDs based on the AlInGaN materials system. FIG. 4 shows that significant advancement was achieved in the last three decades, and strongly suggests more can be anticipated. Table 2—Comparison of conversion (photon/electrical energy) efficiency of select UV sources.

The disclosed technology also utilizes a high intensity UV LED array, leveraging the significant recent advancement in high-brightness LEDs. As a result, photolytic technology will only get more efficient and more cost effective with time.

Photolytic separation of $CO_2$ from amine carbamates in the literature.

A study done by Cameron, et al, the photolysis of 3',5' dimethoxybenzoincyclohexyl carbamates to free cyclohexylamine and carbon dioxide was achieved by using Rayonet lamp for generation of UV irradiation at 350 nm, with conversions was as high as 92-98%.

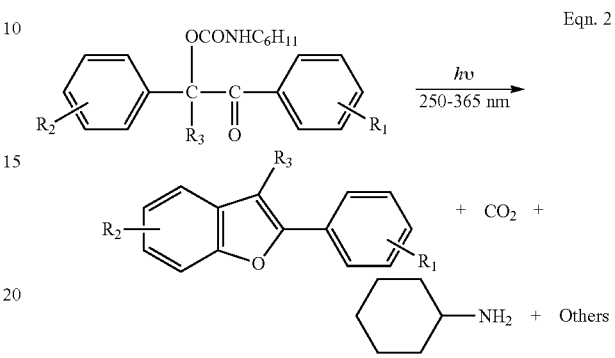

$R_1, R_2 = H, OMe; R_3 = H;$

The study clearly showed that the time required for $CO_2$ desorption was a function of absorption of UV irradiation vs. carbamate concentration. For example, photolysis of $38.6 \times 10^{-3}$ M solution 3',5'-dimethoxybenzoincyclohexyl carbamates to cyclohexamine and $CO_2$, with 98% yield was accomplished in 90 minutes; and the same process for a $6.16 \times 10^{-5}$ M solution produced 98% yield in 9 minutes. The results of this study suggest strongly that photolysis will be able to de-absorb over 90% of the $CO_2$ from an aqueous MEA solution in a continuous process.

DEFINITIONS

Figure 1:
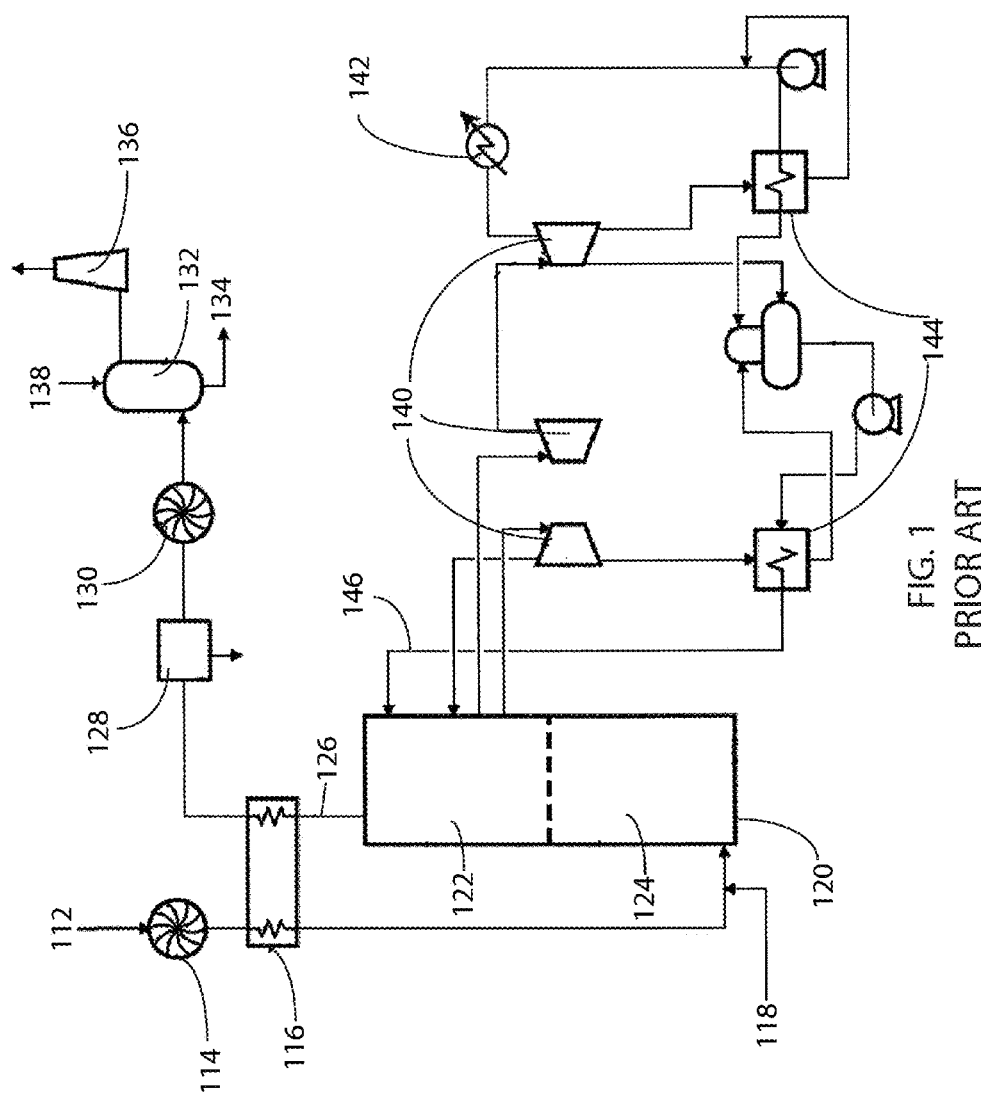
FIG. 1 is a diagram of a prior art coal power plant without $CO_2$ capture.

In the following description and in the figures, like elements are identified with like reference numerals.

The use of "e.g.," "etc," and "or" indicates non-exclusive alternatives without limitation unless otherwise noted.

The use of "including" means "including, but not limited to," unless otherwise noted.

DETAILED DESCRIPTION OF THE EXEMPLARY EMBODIMENTS

While the presently disclosed inventive concept(s) are susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

Prior Photolytic $CO_2$ Separation from $(MEA)_2$—$CO_2$.

The disclosed technology discusses separation of $CO_2$ from scrubber of power plant emission streams as an example, but it is to be understood that this application of the technology is merely one example of possible applications, and is currently a preferred embodiment. Patent law requires that at least one preferred embodiment be listed, but that the invention is defined by the claims, not the disclosed preferred embodiment. After the application is filed, the preferred embodiment may change, and thus the claims are the appropriate reference for the claimed technology. Other possible emission streams include internal combustion engine emissions, and any emission source which contains pollutants. The pollutant addressed in the preferred embodiment is $CO_2$, but it is to be understood that other pollutants may also be removed from emissions streams, such as $SO_x$, $NO_x$, or other pollutants.

Shown in FIG. 1 is a coal power plant without $CO_2$ retracted. This information is prior art and is adapted from a publication of the United States Department of Energy's National Energy Technology Laboratory (US DOE NETL). A fluid air from a power plant enters the system at 112. It goes through a forced draft fan at 114 and through an air heater at 116. The warmed air is mixed with coal 118 and is burned in a furnace 120. The furnace has a convection section 122 and a radiant section 124. An effluent stream 126 exits the furnace 120 and flows through the air heater 116 through a precipitator 128 through an induced draft fan 130 from which it is bubbled through an $SO_2$ scrubber 132. From the $SO_2$ scrubber 132 slurry 134 is recovered, and effluent exits the stack 136. Lime slurry is added to the $SO_2$ scrubber. Another flow of gasses exits the furnace 120 and goes to steam turbines 140, to condenser 142 and water heaters 144. Effluent gasses are routed back to the furnace 120 via line 146.

Figure 2:
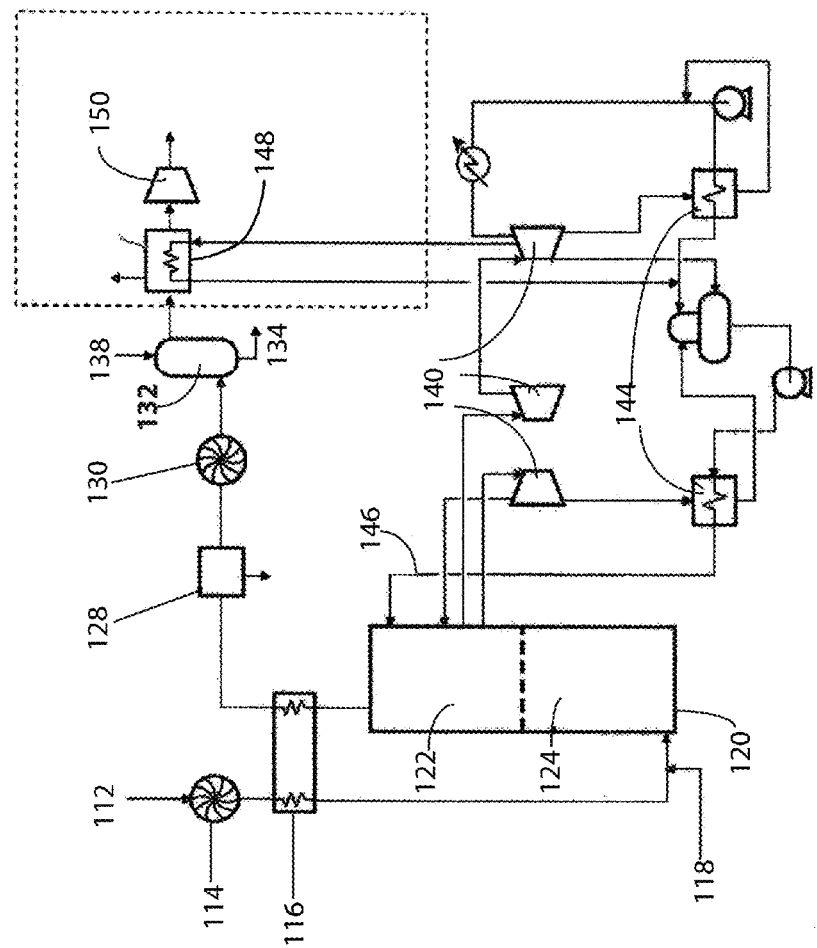
FIG. 2 is a diagram of a prior art coal power plant with MEA technology for $CO_2$ capture, showing the parasitic energy process.

The amine plant of the disclosed technology is shown in FIG. 2. There, MEA absorbs $CO_2$ through chemical reaction in an absorber column. This reaction is reversible, and $CO_2$ is currently separated by heating the $CO_2$-rich amine in a stripper column. The MEA may be recycled through the process.

FIG. 2 shows a coal powered plant with MEA technology for $CO_2$ capture. This shows the parasitic energy process of the prior art. The coal fired power plant of FIG. 2 has the same components as shown in FIG. 1 except for the region after the $SO_2$ scrubber 132. After the $SO_2$ scrubber 132 is an amine plant 148 which includes a heater, and in which $CO_2$ gas is evolved. $CO_2$ gas is collected and concentrated at 150, with the MEA being returned to the recycle system at line 152.

Figure 3:
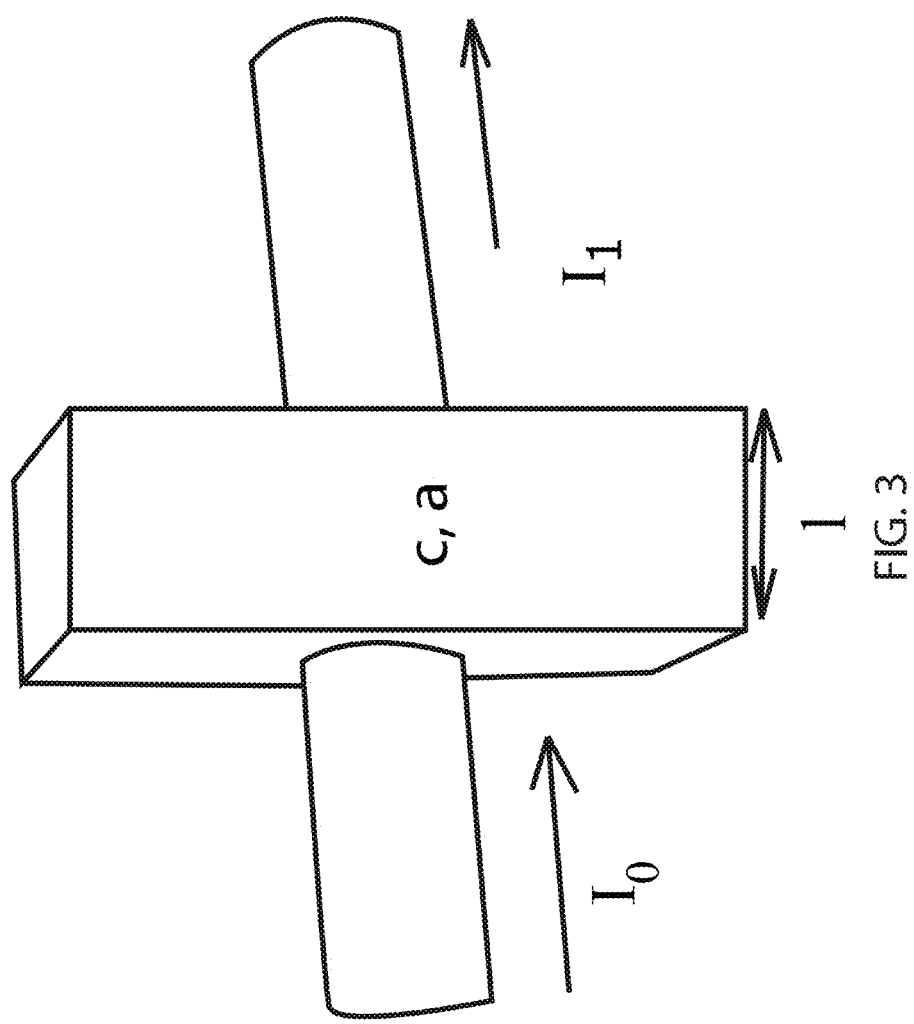
FIG. 3 is a diagram of Beer-Lambert-Bouguer absorption of a beam of light as it travels through a medium of width.

FIG. 3 shows a diagram of Beer-Lambert-Bouguer (BLB) absorption of a beam of light as it travels through a medium. This illustrates that the fraction of light that transmits through a medium is a function of the absorbing coefficient and the width.

Figure 4:
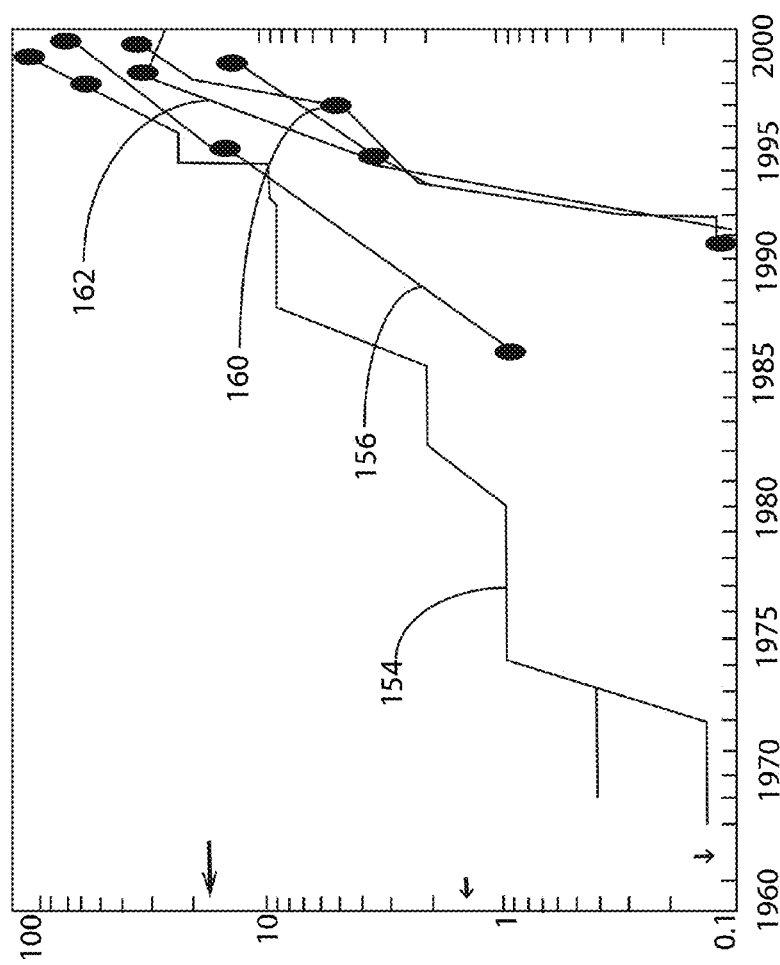
FIG. 4 is a graph showing the increasing output and efficiency of different types of LED technologies.

FIG. 4 shows historical efficiency improvements of LED technologies since 1960-2000. The X axis shows performance in lumens per watt. The Y axis shows time in years. Shown are the improvements in gallium based LEDs in curve 154. Improvements in molecular solid LED are shown in line 156. Improvements in polymer LEDs are shown in line 158. Improvement in nitride LEDs are shown in line 160. Improvements in InGn LEDs are shown in line 162.

Figure 5:
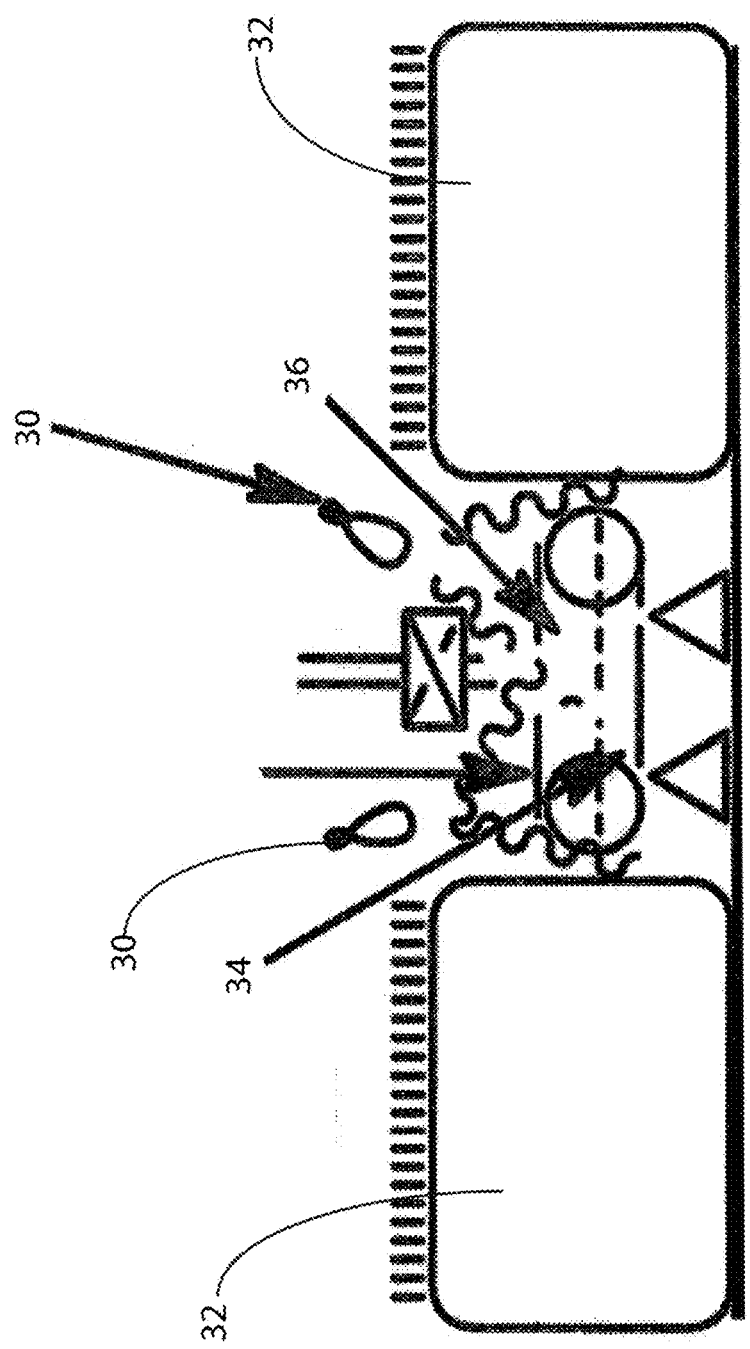
FIG. 5 shows the setup to verify photolytic $CO_2$ separation from aqueous MEA.

FIG. 5 shows the setup to verify photolytic $CO_2$ separation from aqueous MEA solution. Shown are LED generators of monochromatic UV at 365, shown at 30. FIG. 5 also includes an FTIR spectrometer at 32. MEA-$CO_2$ at a 20% solution of MEA is injected into the FTIR spectrometer at 34. Energy from the LED generator 30 causes $CO_2$ evolution from the MEA gas with the $CO_2$ shown originating at 36.

Figure 6:
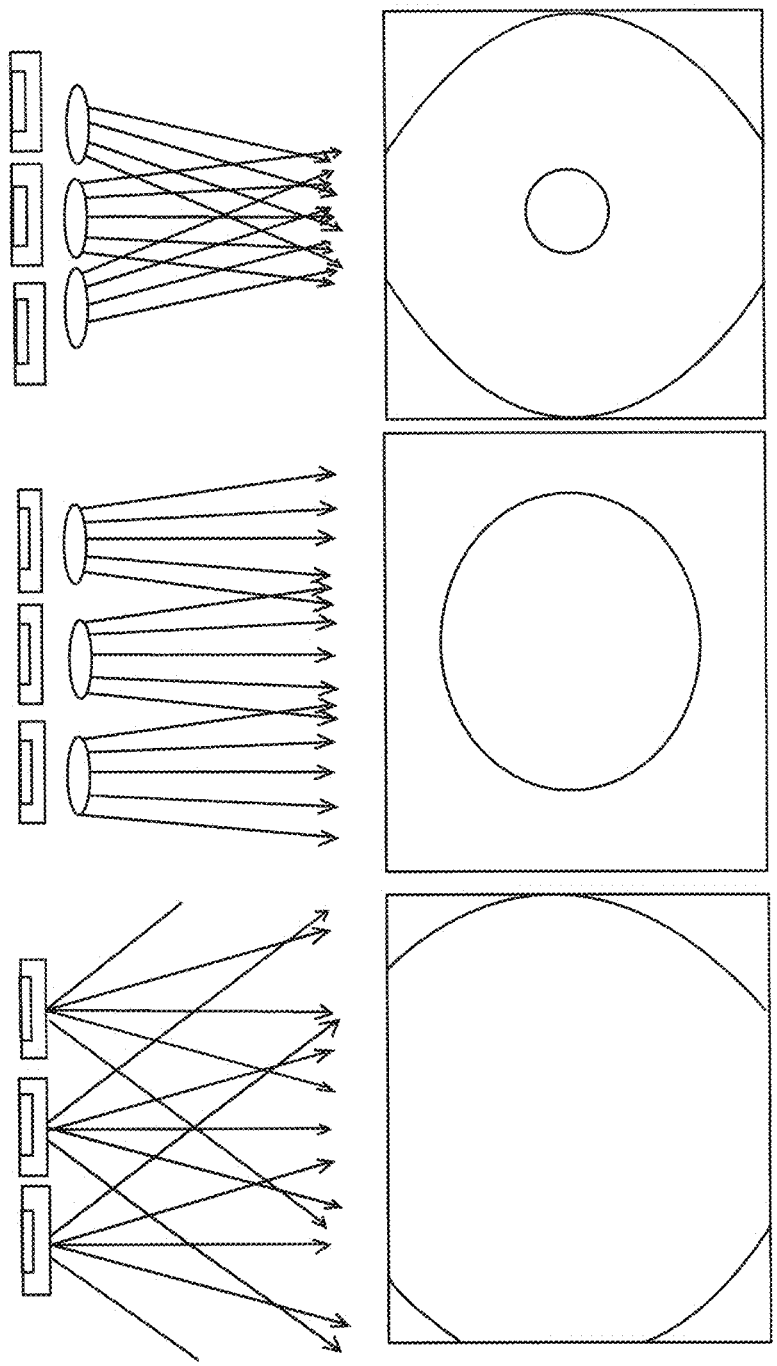
FIG. 6 show different overlapping LED structures.

FIG. 6 shows three views of LED generated light intensities and patterns from different arrangements of LED arrays. Shown on the left of FIG. 6 is an LED array in which no lens is utilized to focus the light from the LED bulbs. The middle picture shows a tighter beam of light which results from the use of reflectors or optics to focus and overlap the light from different LED light sources. LEDs are spontaneous emission devices, with a spatial emission pattern leading that is generally Lambertian without external optics, as illustrated in FIG. 6. In order to improve the working distance from the light source to the illuminated target, an array of LED lenses produce a collimated beam of higher intensity. Gradually expanding beams and overlap combining beam arrays produce 7-fold and 22.4-fold increase in intensity of UV light irradiation from three LEDs in an array (see FIG. 6). The energy density will depend on the photon travel distance, and on whether a lens was used to focus the irradiation from arrays of LEDs or not—see FIG. 7. These factors are adjustable depending on the desired application.

Figure 7:
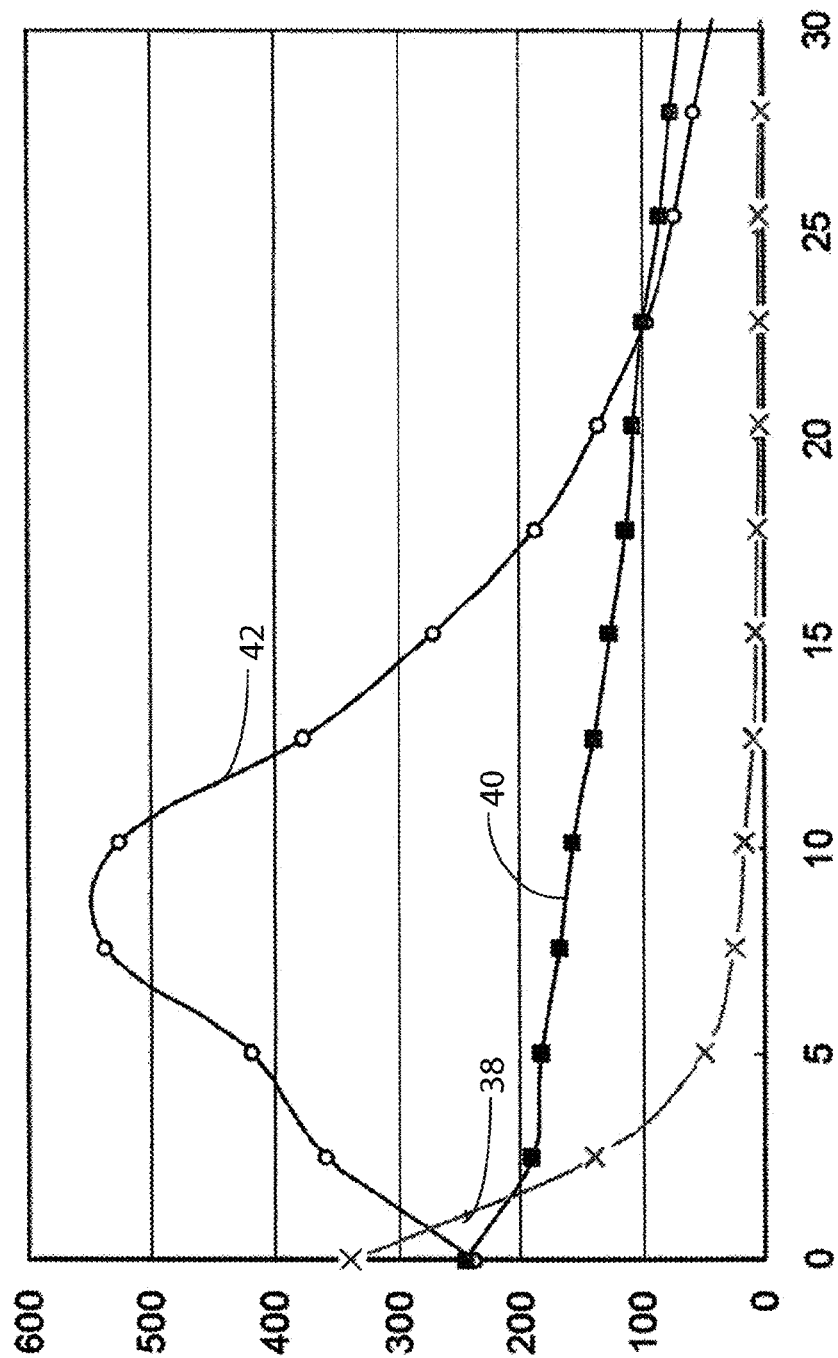
FIG. 7 shows energy intensity as related to photon travel distance.

FIG. 7 shows the irradiance from LEDs as it is affected by the working distance the use of the lens or no lens. The x axis shows irradiance in $mW/Cm^2$ and the y axis shows the working distance in centimeters. The line 38 shows the irradiance when no lens is used, and as would be expected, the irradiance drops off quickly as the working distance becomes greater. Curve 40 shows the irradiance when light from an LED is focused into a parallel beam. As can be see the drop off irradiance is much less pronounced as the working distance increases. Curve 42 shows the affect of combining the light output of several LEDs by overlapping them onto a target. The graph shows that there is an optimum working distance with the irradiance dropping off rapidly from the optimum working distance of approximately 8 centimeters.

Figure 8:
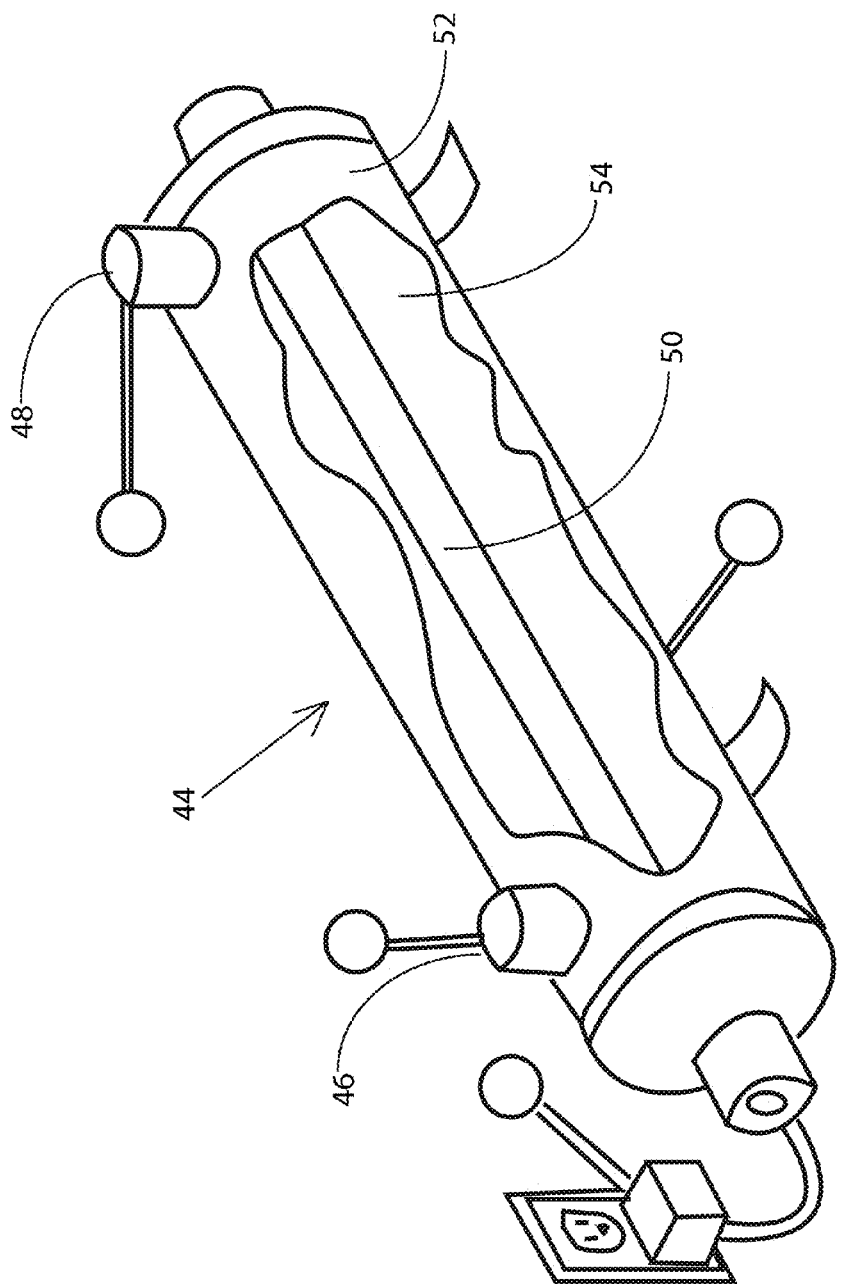
FIG. 8 is a design of a prior art UV water purification device.

FIG. 8 shows prior art design of a UV water purification unit 44. The unit 44 includes an inlet 46 and an outlet 48 an ultra violet source 50 in the form of a tube or rod, a chamber 52 and a liquid medium 54. This kind of device typically uses a germicidal lamp in a quart sleeve, and is built for the purpose of killing microbes by exposure to UV light.

Figure 9:
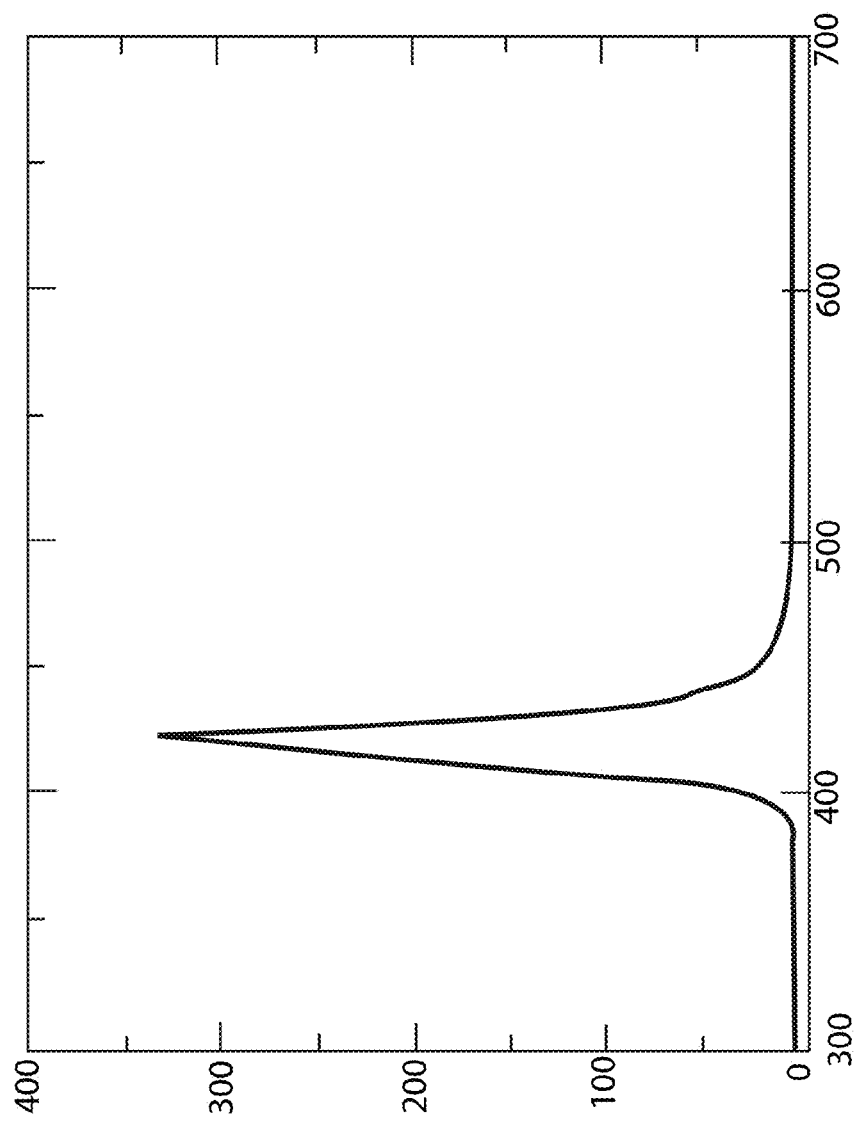
FIG. 9 is a graph showing the typical electroluminescence spectrum from 415 nm solid state LEDs.
Figure 10:
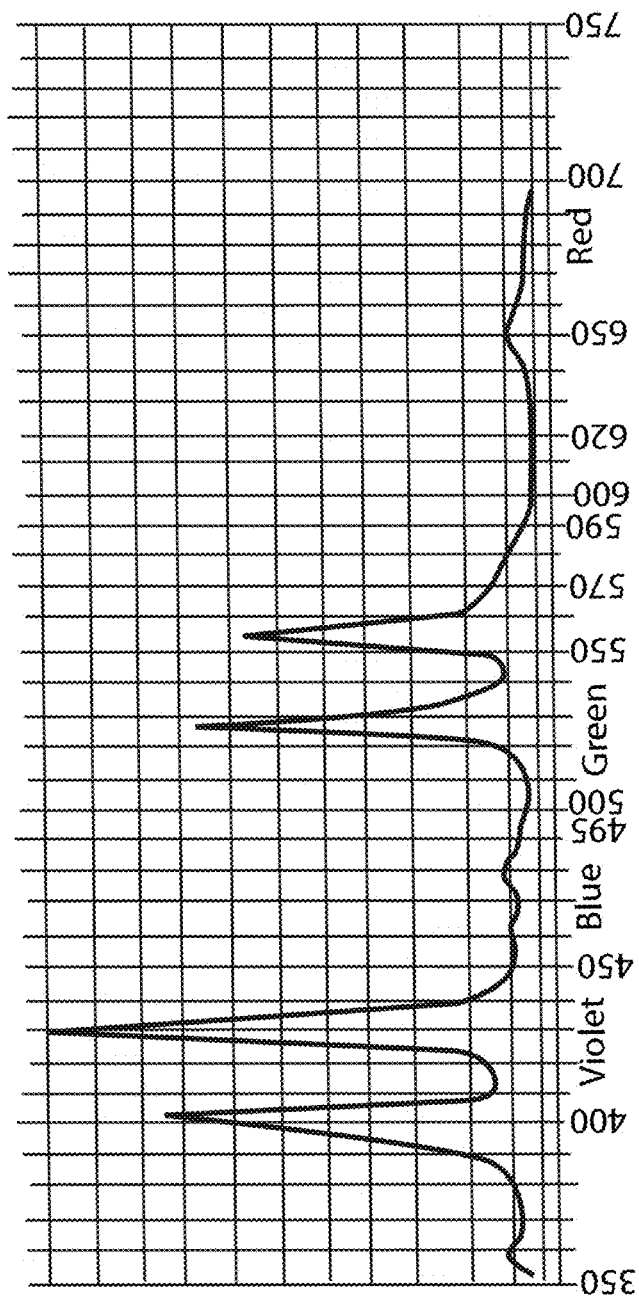
FIG. 10 is a graph of the spectrum of high pressure lamps, showing several energy peaks.

FIG. 9 shows an example of the generation of UV light from an LED with a peak of about 20 nm. By comparison FIG. 10 shows the production of energy from a mercury bulb, which contains a series of peaks throughout the UV tube visible spectrum region. In FIG. 9 the x axis shows intensity and the y axis shows wavelength in nm. FIG. 10 shows relative spectral power on the y axis and the wavelength in nanometers on the y-axis.

Figure 11:
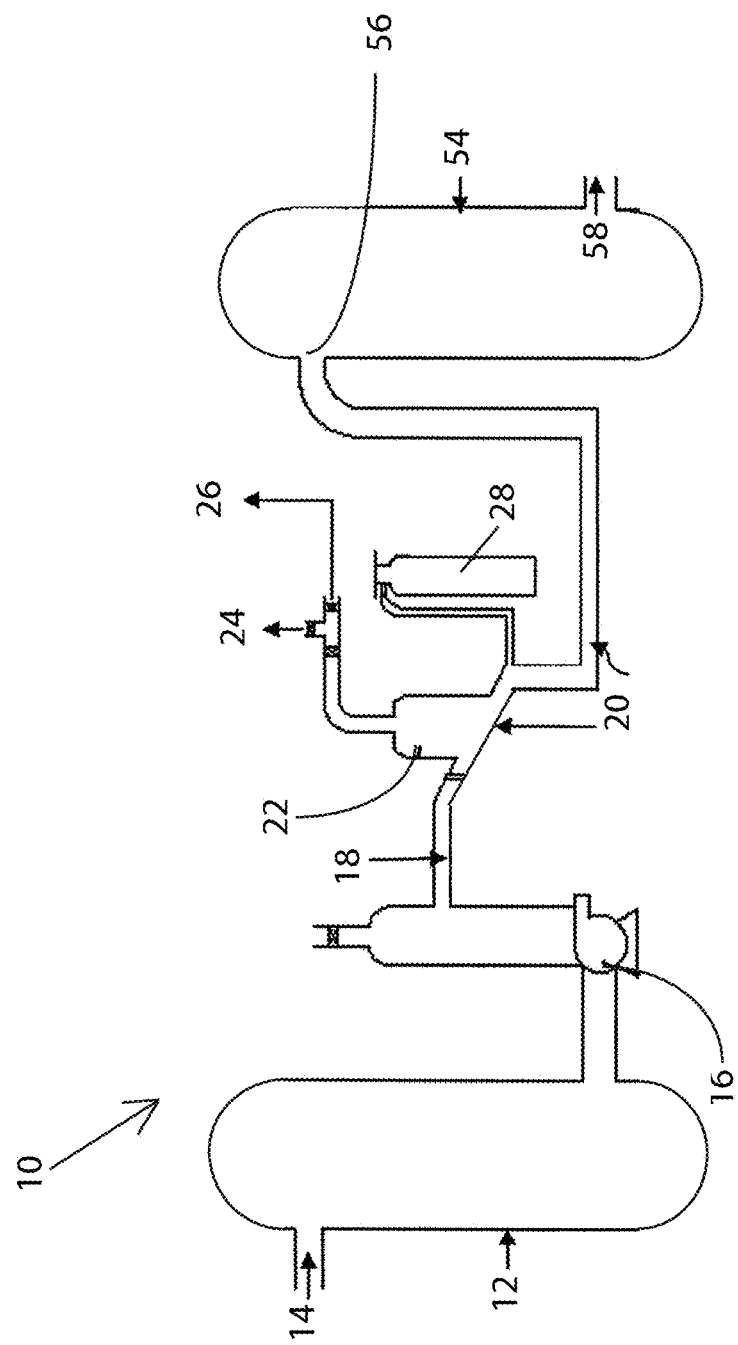
FIG. 11 is a view of a process design of the disclosed technology.
Figure 12:
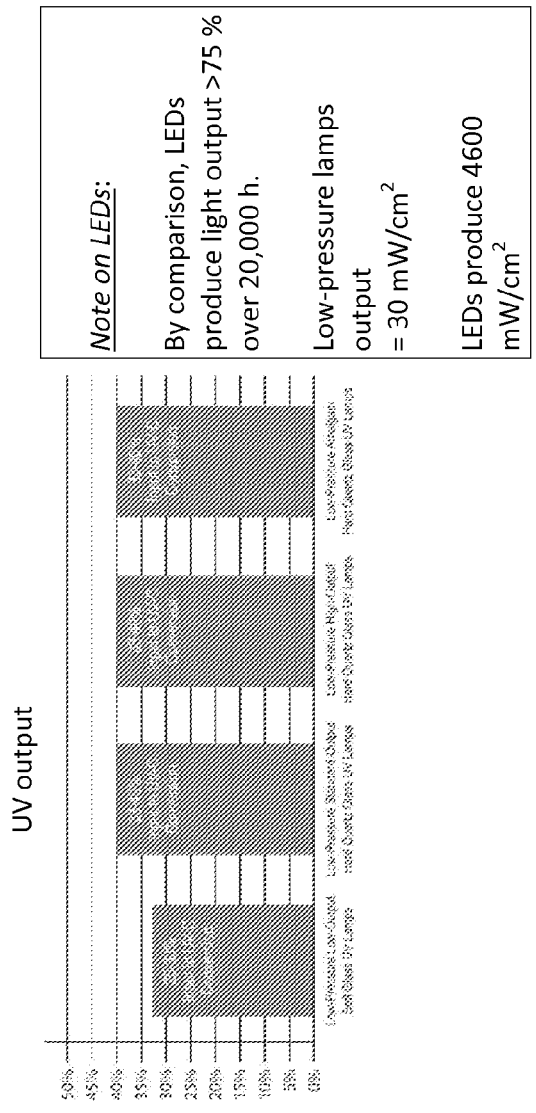
FIG. 12 is a table showing conversion efficiency of UV sources.

FIG. 11 shows a preferred set up for treatment of pollutants such as $CO_2$ from an effluent stream, with the method designated as 10. $CO_2$ rich MEA from an absorption chamber enters a separation chamber 12 at inlet 14. A fan 16 moves the $CO_2$ rich MEA at 18 over a UV LED panel 20. The UV from the LED panel 20 energizes the dissolved $CO_2$ in the MEA, and drives it off as a gas, with the $CO_2$ entering a collection chamber 22 where it may be routed to collection facilities at 24 or to analysis 26. Shown in FIG. 11 is a single LED panel which would be calibrated to provide a narrow band of energy for a specific pollutant, such as $CO_2$, but other designs could have multiple LED panels in series, with each one calibrated for a specific pollutant and the most effective wavelength for that pollutant. Each LED panel could have its own sweep gas source 28 and collection chamber 22.

A sweep gas source 28 is provided to force evolved $CO_2$ into the collection chamber 22 and to prevent $CO_2$ from being reabsorbed into the MEA solution. The sweep gas could be a gas which does not readily absorb into MEA and which is not harmful to have as an affluent fraction. Non reactive gases such as nitrogen, argon, or helium could be used as the sweep gas. An absorption chamber 54 is provided for the purpose of ensuring optimum exposure of the applicable UV wavelength to the scrubber solution. $CO_2$-lean MEA enters the absorption chamber at 56 and exits the absorption chamber at 58 for routing to the $CO_2$ separation process.

The disclosed technology utilizes a photolytic separation process employing LED arrays to generate UV photons to desorb or strip $CO_2$-from MEA carbamate as a result of using aqueous MEA for Carbon dioxide capture. The disclosed technology removes as much as 90% of the $CO_2$ with less than a 45% increase in the COE. The disclosed technology will have a strong impact on lowering the COE of the current state-of-the-art MEA-carbon capture technology.

Cooper et al. have shown that it is possible to absorb 97% of the UV generated for cleaning swimming pool water. The disclosed technology frees up to 90% $CO_2$ from $(MEA)_2$—$CO_2$ in 20 or 30% aqueous MEA scrubbers. A thin liquid film photochemical reactor, is one preferred embodiment that may be used in a successfully large scale process to evaluate released $CO_2$.

With the appropriate design, liquid film thickness can be adjusted for efficient absorption of UV radiation by the $CO_2$-rich MEA mixture. Further, the impact of flow rate, and contact time on the separation of $CO_2$ from $(MEA)_2$-$CO_2$ will be studied. UV transparent quartz glass will be used to construct the reactor surface in order to achieve maximum absorption on photon energy by the process. A counter flow of sweep gas can be used to remove $CO_2$ generated by exposure of $CO_2$-rich MEA to UV.

Table 2 lists frequencies (or wavelengths) presently preferred for dissociating bonds of the pollutants listed.

TABLE 2

UV maximum absorption wavelength selected Bonds in $(MEA)_2$-$CO_2$, (MEA)-$SO_x$, $SO_x$, $NO_x$, etc

| Chemical Bond | Maximum Wavelength for Dissociation [nm] |
| --- | --- |
| N—H (NH) | 336.4 |
| N—O | 595.6 |
| S—N | 248.6 |
| S—O | 240.3 |
| $(MEA)_2$-$CO_2 \rightarrow 2MEA + CO_2$ | 350-420 |

One of the significant advantages of UV AlInGaN LEDs over high pressure lamps is that they generate UV radiation over a very narrow spectral band, as illustrated in FIGS. 10 and 11. As FIG. 10 shows, UV LEDs have a relatively narrow unfiltered spectral output, typically with a FWHM of only 20 nm. In comparison, the spectral output from a mercury bulb (FIG. 11) contains a series of several peaks throughout the UV to visible spectral region. As a result, such bulbs require a filter sleeve to remove the unwanted peaks. This represents a direct energy loss that increases the input power to the lamp necessary to obtain the requisite energy density for the photolytic process. The disclosed technology is an improvement over this use of energy by utilizing LEDs with a narrow spectral output, but one which is selected for effectiveness for a particular pollutant such as $CO_2$, $SO_x$ or $NO_x$, as examples.

The disclosed technology may be operated as a batch process, and also as a continuous process.

The operation of the photochemical reactor and the method of its use (FIG. 11) involve: (i) production of $molCO_2/molMEA$ and UV analysis of specific concentration; (ii) valve off the inlet and outlet to isolate liquid mixture in the thin film photochemical reactor; (iii) turn ON nitrogen ($N_2$) sweep gas flow to begin to create homogeneous or heterogeneous bubbles; (iv) switch ON the LED UV generator; (v) apply monochromatic UV irradiation at 200-420 nm range from LED UV generator; (vi) monitor the change in amine and carbamate concentrations (in the case of $CO_2$ removal) in the reactor as a function of time by analysis of grab samples by UV spectrophotometer; (vii) real-time quantitative analysis of $CO_2$ production by online FTIR spectroscopy; (viii) determine the presence of byproducts in the liquid phase by UV analysis; and in the gas phase by FTIR; (ix) begin real-time online analysis of $CO_2$ in the $N_2$ sweep gas; and (x) record UV spectrum of liquid grab samples from the process vent, over varying periods of operation.

The method of the disclosed technology includes the steps of selecting the optimum LED frequency output and working distance for a selected effluent pollutant, such as $CO_2$, $SO_x$, or $NO_x$, mixing a process (coal power plant, internal combustion engine) effluent with an absorption media (such as MEA) for absorption of the pollutant, passing the pollutant rich media over at least one LED UV source, for irradiation and release of the pollutant as a gas, sweeping the evolved gas into a collection system with a sweep gas, to prevent re-absorption of the pollutant into the media, collecting and/or analyzing the pollutant gas, and returning MEA to the absorption cycle.

While certain exemplary embodiments are shown in the Figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

What is claimed is:

1. A method for removal of pollutants from effluent streams, comprising the steps of:
    passing gaseous effluent streams through an absorptive media for absorption of pollutant oxides into said absorptive media;
    routing said absorptive media with absorbed pollutant oxides to a UV reaction chamber;
    irradiating said absorptive media with absorbed pollutant oxides with LED generated UV at a wavelength selected for maximum energy efficiency of release of pollutant oxides from said absorptive media, with said pollutant oxides exiting said media as a gas;
    capturing gaseous pollutant oxides for compression and disposal;
    returning said absorptive media with pollutant oxides removed to contact with said gaseous effluent streams.

2. The method of removal of pollutants of claim 1 in which the method further comprises the step of releasing carbon dioxide as the pollutant oxide.

3. The method of removal of pollutants of claim 1 in which the method further comprises the step of releasing sulfur dioxides as the pollutant oxide.

4. The method of removal of pollutants of claim 1 in which the method further comprises the step of releasing nitrous oxide as the pollutant oxide said pollutant oxide.

5. The method of removal of pollutants of claim 1 in which the method further comprises using an absorptive media selected from the list consisting of monoethanolamine, and ammonia.

6. The method of removal of pollutants of claim 1 in which the method further comprises the step of using LED generated UV is confined to a frequency band restricted to less than 50 nm in width.

7. The method of removal of pollutants of claim 6 in which the method further comprises the step of using LED generated UV is produced between 200 to 420 nm.

8. The method of removal of pollutants of claim 6 in which the method further comprises the step of using LED generated UV is produced between 260 to 400 nm.

9. The method of removal of pollutants of claim 6 in which the method further comprises the step of using LED generated UV is produced between 300 to 420 nm.

10. The method of removal of pollutants of claim 6 in which the method further comprises the step of using LED generated UV is produced between 380 to 400 nm.

11. The method of claim 1 in which the method further comprises the step of using an effluent stream comprised of effluent from a power generation plant.

12. The method of claim 1 in which the method further comprises the step of using an effluent stream comprised of effluent from an internal combustion engine.

13. A method for removal of pollutants from effluent streams, comprising the steps of:
passing gaseous power plant effluent streams through an absorptive media for absorption of carbon dioxide into said absorptive media;
routing said absorptive media with absorbed carbon dioxide to a UV reaction chamber;
irradiating said absorptive media with absorbed carbon dioxide with LED generated UV at a wavelength selected for maximum energy efficiency of release of carbon dioxide from said absorptive media, with said carbon dioxide exiting said media as a gas;
capturing gaseous carbon dioxide for compression and disposal;
returning said absorptive media with carbon dioxide removed to contact with said gaseous effluent streams.

14. A method for removal of pollutants from effluent streams, comprising the steps of:
passing gaseous power plant effluent streams through an absorptive media for absorption of sulfur dioxide into said absorptive media;
routing said absorptive media with absorbed sulfur dioxide to a UV reaction chamber;
irradiating said absorptive media with absorbed sulfur dioxide with LED generated UV at a wavelength selected for maximum energy efficiency of release of sulfur dioxide from said absorptive media, with said sulfur dioxide exiting said media as a gas;
capturing gaseous sulfur dioxide for compression and disposal;
returning said absorptive media with sulfur dioxide removed to contact with said gaseous effluent streams.

15. A method for removal of pollutants from effluent streams, comprising the steps of:
passing gaseous power plant effluent streams through an absorptive media absorption of nitrous oxide into said absorptive media;
routing said absorptive media with nitrous oxide to a UV reaction chamber;
irradiating said absorptive media with absorbed nitrous oxide with LED generated UV at a wavelength selected for maximum energy efficiency of release of nitrous oxide from said absorptive media, with said nitrous oxide exiting said media as a gas;
capturing gaseous nitrous oxide for compression and disposal;
returning said absorptive media with nitrous oxide dioxide removed to contact with said gaseous effluent streams.

16. The method of removal of pollutants of claim 15 in which the method further comprises the step of releasing carbon dioxide as the pollutant oxide.

17. The method of removal of pollutants of claim 15 in which the method further comprises the step of releasing sulfur dioxides as the pollutant oxide.

18. The method of removal of pollutants of claim 15 in which the method further comprises the step of releasing nitrous oxide as the pollutant oxide said pollutant oxide.

19. The method of removal of pollutants of claim 1 in which the method further comprises using an absorptive media comprised of monoethanolamine.

20. The method of removal of pollutants of claim 15 in which the method further comprises the step of using LED generated UV is confined to a frequency band restricted to less than 50 nm.

21. The method of removal of pollutants of claim 20 in which the method further comprises the step of using LED generated UV is produced between 200 to 420 nm.

22. The method of removal of pollutants of claim 20 in which the method further comprises the step of using LED generated UV is produced between 260 to 400 nm.

23. The method of removal of pollutants of claim 20 in which the method further comprises the step of using LED generated UV is produced between 300 to 420 nm.

24. The method of removal of pollutants of claim 20 in which the method further comprises the step of using LED generated UV is produced between 380 to 400 nm.

25. The method of claim 15 in which the method further comprises the step of using an effluent stream comprised of effluent from a power generation plant.

26. The method of claim 15 in which the method further comprises the step of using an effluent stream comprised of effluent from an internal combustion engine.

27. A method for removal of oxides from gaseous effluent streams, comprising the steps of:
passing gaseous streams through an absorptive media for absorption of oxides into said absorptive media;
routing said absorptive media with absorbed oxides to a UV reaction chamber;
irradiating said absorptive media with absorbed oxides with LED generated UV at a wavelength selected for maximum energy efficiency of release of a selected oxide from said absorptive media, with said oxides exiting said media as a gas;
separating gaseous oxides from said effluent stream for use, release, or disposal;
returning said absorptive media with oxides removed to contact with said gaseous effluent streams.

* * * * *

UNITED STATES PATENT AND TRADEMARK OFFICE
CERTIFICATE OF CORRECTION

Page 1 of 1

PATENT NO.       : 8,636,968 B2
APPLICATION NO.  : 13/006110
DATED            : January 28, 2014
INVENTOR(S)      : Omotowa It is certified that error appears in the above-identified patent and that said Letters Patent is hereby corrected as shown below:

In the Specification

Column 1, line 4-8, should read,

--Statement Regarding Federally Sponsored Research or Development--

--This invention was made with Government support under NSF Award No. 1151935 (Title: "Photochemical Reactor for $CO_2$ Separation in Carbon Capture Process") awarded by the National Science Foundation. The Government has certain rights in this invention. 45 CFR 650.4(f)(4).--

Signed and Sealed this
Sixteenth Day of September, 2014

Michelle K. Lee
*Deputy Director of the United States Patent and Trademark Office*